3,072,665
FLUORENYL AND XANTHYDRYL ETHERS OF 1-ALKYL-3-PIPERIDINOLS
Stephen B. Coan, Livingston, N.J., assignor to Schering Corporation, Bloomfield, N.J., a corporation of New Jersey
No drawing. Original application Jan. 20, 1955, Ser. No. 483,169. Divided and this application Dec. 30, 1960, Ser. No. 79,549
3 Claims. (Cl. 260—294.7)

The invention relates to a new group of compounds which have desirable therapeutic properties. More particularly, this invention relates to ethers of N-substituted 3-piperidines together with their non-toxic acid addition and quaternary salts, and to methods for their manufacture. The compounds of this invention are noted particularly for their selectivity of action upon the in situ uterus.

The free bases of the present invention may be represented by the following general formula:

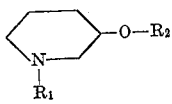

wherein R′ is a member of the group consisting of lower alkyl and monocyclic aralkyl, $R_2$ is a member of the group consisting of fluorenyl, and xanthyl radicals which may be substituted by halogen, lower alkyl and lower alkoxy groups. Representative examples of $R_1$ are methyl, ethyl, propyl, hexyl, benzyl and the like while representative illustrations of $R_2$ are 9-fluorenyl, 9-xanthyl, 3-chloro-9-xanthyl and the like.

I have found that the compounds represented by the general formula exhibit marked oxytocic activity. Furthermore, I have found that these compounds, in their oxytocic action, are relatively selective in that the elevation of tonus and increased contractions of an in situ primed uterus easily occur with a concomitant complete absence of side effects. For example, at a dose normally employed for the manifestation of oxytocic action, the compounds of this invention are for the most part devoid of activity as antihistaminics, antispasmodics or parasympathetic blocking agents. This selectivity of action upon the in situ primed uterus is surprising since isomers of these compounds which contain the ether linkage at the 4-position, are not only oxytocic but also simultaneously act upon other systems and organs of the body by simultaneously exhibiting antihistaminic and anticholinergic properties. The side effects arising from the latter two physiological actions such as drowsiness, mydriasis, xerostomia and the like, are undesirably present. Thus, I have suprisingly found that the compounds of my invention, unlike their isomers and homologs, are selective in their action upon the primed in situ uterus and are relatively devoid of undesirable secondary properties and side effects.

These new compounds are useful in the prevention or treatment of post partum hemorrhage, certain cases of excessive uterine bleeding, induction of labor and other similar instances where oxytocic action is therapeutically indicated.

The compounds of my invention are preferably administered orally in the form of tablets, capsules, elixirs and the like, and generally in conjunction with a non-toxic carrier or vehicle. Where parenteral administration is indicated, solutions of the salts are easily prepared in water or other non-toxic therapeutically acceptable vehicles.

The compounds of this invention may generally be prepared by reacting a 1-alkyl-3-piperidinol with a halide, such as a bromofluorene in the presence of a basic agent, and if desired, an inert solvent such as toluene or xylene.

Although the compounds of my invention may be prepared by simply heating the desired reactants together until the desired ether is obtained, I prefer to perform the reactions in the presence of some inert solvents such as an aliphatic or aromatic hydrocarbon or high-boiling ether. The particular solvent is not critical since its primary purpose is to permit more efficient interaction of the reactants. Thus, any unreactive solvent having a boiling point above about 80° may be employed.

In this reaction, a mole of hydrohalic acid is liberated and since it may precipitate the ether, or even some unreacted amino-alcohol, I prefer to employ an acid acceptor such as pyridine, dialkylanilines, or inorganic bases such as sodium or potassium carbonate. Alternatively, an excess of basic alcohol may be used to neutralize the hydrogen halide released. In those cases wherein the basic alcohol is liquid at the reaction temperature, it may be employed as solvent.

The reaction is preferably carried out more or less under anhydrous conditions in order to realize more favorable yields; therefore, it is preferable to employ only substantially anhydrous reactants and solvents.

Moreover, the free bases of the general formula may be prepared by reacting the sodium salts of the amino alcohol with the appropriate halide, preferably in an inert solvent. Conversely, the sodium salt of an appropriate alcohol may be reacted with a 1-alkyl-piperidine containing a halogen atom in the 3-position. For example, reacting the sodium salt of 1-ethyl-3-piperidinol with xanthydryl bromide in refluxing toluene yields the xanthydryl ether of 1-ethyl-3-piperidinol. Similarly, reacting the sodium salt of xanthydrol with 1-ethyl-3-chloropiperidine in refluxing toluene, yields the same product.

The non-toxic acid addition salts of the basic ethers and thioether of the general formula are prepared by reacting the basic ether directly with an acid in the usual manner, preferably in the presence of an inert solvent.

The quaternary salts of the free bases of this invention may be prepared by reacting the base with an alkyl halide or sulfate such as methyl bromide and the like, optionally in the presence of an inert solvent. Alternatively, quaternary chlorides and bromides may be prepared from corresponding iodides by heating an alcoholic solution of the iodide in the presence of a silver halide, whereupon halogen exchange is effected.

The following examples illustrate the preparation of the compounds of this invention, but do not limit invention, except as defined in the appended claims.

EXAMPLE 1

*1-Ethyl-3-Piperidyl 9′-Fluorenyl Ether*

A mixture of 14.5 g. of 1-ethyl-3-piperidinol, 11 g. of anhydrous potassium carbonate and 200 ml. of xylene is heated to reflux. While stirring the mixture, 30 g. of 9-bromofluorene is added portionwise and the resultant mixture stirred and refluxed overnight. After cooling, the mixture is poured into water and extracted with ether. The ether solution is extracted with dilute aqueous hydrochloric acid and the acid solution, after treatment with dilute sodium hydroxide solution, is extracted with ether. The ether extracts are washed with water, dried over anhydrous potassium carbonate, concentrated in vacuo and distilled to yield 1-ethyl-3-piperidyl 9′-fluorenyl ether, B.P. 175–180°/1 mm.

EXAMPLE 2

1-Methyl-3-Piperidyl 9'-Xanthyl Ether

A mixture of 0.13 mole of 1-methyl-3-piperidinol and 0.06 mole of anhydrous potassium carbonate is heated, while stirring, to 120–130°. To the hot mixture is added 0.1 mole of xanthydryl bromide and the resultant mixture is stirred and heated at 130° for 8 hours. After cooling, the mixture is diluted with water and extracted with ether. The ether solution is extracted with dilute hydrochloric acid which is then made strongly alkaline with sodium hydroxide solution. The alkaline mixture is extracted with ether which, after drying with anhydrous potassium carbonate, is concentrated and distilled to yield the xanthydryl ether of this example, B.P. 190–195°/1 mm.

This application is a division of my copending application Serial No. 483,169, filed January 20, 1955, and now abandoned.

I claim:

1. A compound of the group consisting of piperidyl ethers having the following structural formula:

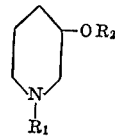

the pharmaceutically acceptable non-toxic acid addition salts, the quaternary alkyl halides, and quaternary alkyl sulfates thereof, wherein $R_1$ is a member of the group consisting of lower alkyl and benzyl, and $R_2$ is a member of the group consisting of fluorenyl and xanthyl.

2. 1-ethyl-3-piperidyl 9'-fluorenyl ether.
3. 1-methyl-3-piperidyl 9'-xanthyl ether.

No references cited.